United States Patent

Naarmann et al.

[11] 3,933,765
[45] Jan. 20, 1976

[54] POLYMERS CONTAINING THIOGLYCOL GROUPS

[75] Inventors: Herbert Naarmann, Wattenheim; Heinz Pohlemann, Limburgerhof, both of Germany

[73] Assignee: BASF Aktiengesellschaft, Ludwigshafen (Rhine), Germany

[22] Filed: Mar. 21, 1974

[21] Appl. No.: 453,376

[30] Foreign Application Priority Data
Mar. 31, 1973 Germany............................ 2316299

[52] U.S. Cl................................... 260/79.7; 260/79
[51] Int. Cl................................................ C08f 3/84
[58] Field of Search............................. 260/79, 79.7

[56] References Cited
UNITED STATES PATENTS
3,585,167  6/1971  Naarmann et al................. 260/77.5

*Primary Examiner*—Melvyn I. Marquis
*Attorney, Agent, or Firm*—Johnston, Keil, Thompson & Shurtleff

[57] ABSTRACT

Polymers containing units of the general formula:

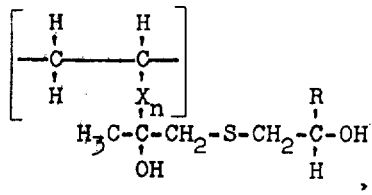

in which
X denotes $-CH_2-$, $-CH_2-CH_2-$,

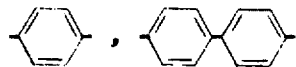

or divalent $C_3{+}_{10}$ cycloalkyl,
$n$ denotes 0 or 1 and
R denotes H, $C_1{+}_{10}$ alkyl or aryl.

These polymers are used in the manufacture of cross-linkable coatings and for finishing papers and textiles.

1 Claim, No Drawings

POLYMERS CONTAINING THIOGLYCOL GROUPS

This application discloses and claims subject matter described in German patent application P 23 16 299.4, filed Mar. 31, 1973, which is incorporated herein by reference.

This invention relates to polymers containing units of the general formula:

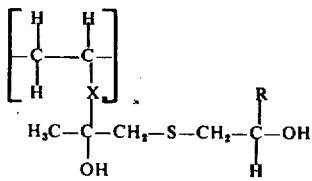

It is known that vinyl compounds containing no hydroxyl groups, such as ethylene, styrene and vinyl chloride, may be readily homopolymerized or copolymerized. Vinyl compounds containing hydroxyl groups, e.g. allyl alcohol or butene-1-ol-3, are virtually unpolymeriable to high molecular weight substances under the usual conditions of high-pressure polymerization. These compounds act as chain stoppers, for example in the free radical polymerization of ethylene, and polyethylene produced in the presence of such chain stoppers has a lower molecular weight than that obtained in the absence of such chain stoppers under similar polymerization conditions.

It is an object of the invention to provide polymers which contain a number of functional groups and are therefore capable of entering into further reactions.

This object is achieved in accordance with the present invention by polymers containing units of the general formula:

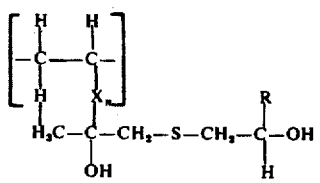

in which
X denotes —CH$_2$—, —CH$_2$—CH$_2$—,

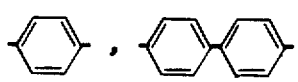

or divalent C$_{3-10}$ alkyl,
n denotes 0 or 1 and
R denotes H, C$_{1-10}$ alkyl or aryl.

The thiol group-containing polymers are prepared by polymerizing a compound of the general formula:

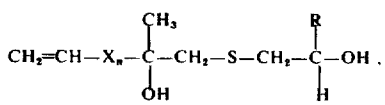

in which X denotes —CH$_2$—, —CH$_2$—CH$_2$—,

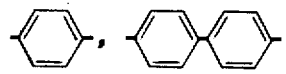

or divalent C$_{3-10}$ cycloalkyl, n is 0 or 1 and R is H, C$_{1-10}$ alkyl or aryl, is polymerized optionally together with other ethylenically unsaturated monomers, at temperatures of from 0° to 150°C in the presence of free-radical initiators. In the last-named general formula, R may also be substituted aryl.

The polymers of the invention contain hydroxyl groups and sulfur bridges. Such polymers are reactive on account of the said functional groups and may be modified by further reactions. It is surprising that ethylenically unsaturated monomers containing sulfur bridges and hydroxyl groups can be polymerized to substances of high molecular weight, because compounds containing sulfur and hydroxyl groups are known to act as polymerization inhibitors or chain stoppers.

Suitable ethylenically unsaturated thioglycols are for example

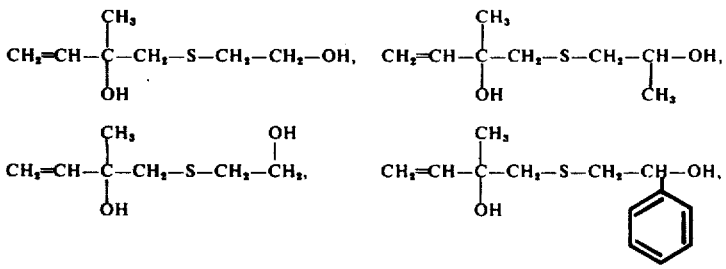

The above ethylenically unsaturated thioglycols are prepared by reacting ethylene oxides with thioglycol derivatives in a molar ratio of about 1 : 1 and at temperatures of from 50° to 100°C. Usually, from 0.1 to 1% by weight, based on the reactants, of a base such as caustic soda or triethylamine is added. The reaction is complete after about 30 minutes to 10 hours. The product consists of an isomeric mixture which always contains more than 90% of the above compounds. The ethylenically unsaturated thioglycol compounds may be very easily prepared in a pure form. Separation of the isomers presents no difficulty. The reaction of the ethylenically unsaturated ethylene oxides with the mercapto derivatives may be carried out in the presence or absence of solvents such as aromatic hydrocarbons or ethers.

The relevant ethylenically unsaturated thioglycol derivatives may be polymerized with the aid of oxygen or free-radical initiators. Suitable initiators are for example hydrogen peroxide, organic hydroperoxides and peroxides, caproyl peroxide, lauroyl peroxide, t-butyl perbenzoate, dicumyl peroxide, p-methane hydroperoxide, cumene hydroperoxide, succinic peroxide and also aliphatic azo compounds capable of disintegrating into free radicals under the conditions of polymerization, for example 2,2'-azo-bis-2,4-dimethylvaleronitrile, 2,2'-azodiisobutyronitrile and analogous azonitriles such as are listed in J. Hine, "Reaktivitaet und Mechanismum in der organischen Chemie," Verlag Georg Thieme, Stuttgart 1960, page 412, and also conventional redox catalyst systems such as systems consisting of potassium or ammonium persulfate and ascorbic acid, sodium hydrosulfite or iron(II) salts.

Also suitable are chelates of transition metals known to be effective as free-radical initiators, particularly those in which the metal is present in an unusual valency, such as chelates of manganese(III), cobalt(III), copper(II) and cerium(IV). The complexing agents used are generally 1,3-dicarbonyl compounds. As examples there may be mentioned manganese(III) acetylcarbonate and cobalt(III) acetoacetate.

The initiators are generally used in an amount of from 0.05 to 5% and preferably from 0.1 to 2.5% by weight of the weight of monomer. The most suitable initiator and the most suitable amount thereof may be readily determined by simple experiment.

The ethylenically unsaturated thioglycol derivatives may also be polymerized by the action of high energy radiation. Particularly suitable radiation consists of electron beams or cobalt 60 radiation.

Polymerization of the ethylenically unsaturated thiolglycol derivatives may be carried out in bulk or in the presence of solvents or diluents. Suitable solvents are for example alcohols such as methanol, ethanol, propanol, n-, iso- and t-butanols, ketones such as methyl ethyl ketone and methyl propyl ketone, ethers such as tetrahydrofuran and dioxane, and aliphatic, cycloaliphatic or aromatic hydrocarbons such as heptane, hexane, cyclohexane and benzene. Also suitable are formamide and dimethyl formamide. Water may be used as diluent. As in other polymerization systems, the polymers of the invention may be manufactured by the well-known suspension, solution and emulsion polymerization processes. It is possible to use auxiliaries if desired, for example buffer systems, dispersing agents and protective colloids. The polymerization temperature may be varied within wide limits, approximately from 0° to 150°C and preferably from 50° to 120°C.

The monoethylenically unsaturated thioglycol derivatives may, if desired, be copolymerized with other monoethylenically or diethylenically unsaturated compounds. Examples of suitable monoethylenically and diethylenically unsaturated compounds are olefins having from two to six carbon atoms, for example ethylene, propylene, butene-1, butadiene-1,3, isoprene, 2,3-dimethyl butadiene-1,3, styrene and substituted styrenes such as α-methylstyrene, p-methylstyrene and p-chlorostyrene; acrylates and methacrylates derived from alcohols of from one to 18 and preferably from 1 to 8 carbon atoms, for example acrylates and methacrylates of methanol, ethanol, n-, iso- and t-butanols and 2-ethylcyclohexanol; vinyl esters derived from carboxylic acids of from two to four carbon atoms, for example vinyl acetate and vinyl propionate; acrylamide and methacrylamide and the corresponding N-substituted amides such as N-methylol acrylamide, N-methylol methacrylamide and their ethers such as N-methylol acrylamide butyl ether, N-methylol methacrylamide methyl ether; acrylonitrile and methacrylonitrile; vinyl ethers such as methyl, ethyl and alkyl vinyl ethers having $C_{3-8}$ alkyl radicals and also fumaric acid, maleic acid and itaconic acid and esters thereof, acrylic acid, methacrylic acid and maleic anhydride. Of the above compounds, two or more may be simultaneously copolymerized with the ethylenically unsaturated thioglycol derivatives. For example, a mixture of an ethylenically unsaturated thioglycol derivative, 2-ethylhexyl acrylate and acrylic acid may be copolymerized.

In the preparation of copolymers, the proportion of ethylenically unsaturated thioglycol derivative in the monomeric mixture may be varied within wide limits, for example from 99 to 0.1% and preferably from 20 to 5% by weight. The comonomers are randomly distributed in the copolymer. In cases where the comonomer is ethylene, the copolymers may contain, for example, units of the formulae:

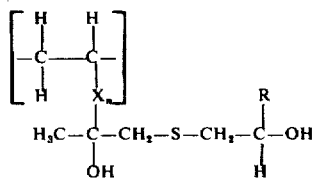

and
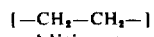

If, in addition to ethylene, an acrylate is also used as comonomer, the copolymers of the invention may be represented by the following formula:

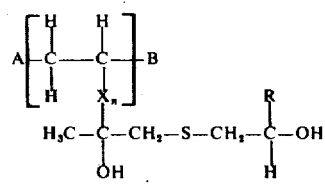

in which A is [—CH$_2$—CH$_2$—] and B is

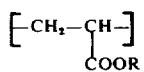

The K values of the homopolymers and copolymers of the invention are between 20 and 110 [as determined by the method proposed by H. Fikentscher in Cellulosechemie, 13, 58 (1932) in 1% dimethyl formamide solution].

Particular attention should be paid to the copolymerization of ethylenically unsaturated thioglycol derivatives with ethylene. In this case, as in other cases in which very low-boiling monomers are used, it is necessary to carry out polymerization under elevated pressure. Copolymerization with ethylene is usually carried out under pressures of up to 3,000 atmospheres and preferably in the range 1,000 to 2,500 atmospheres. Ethylene copolymerization may be carried out in the absence of a solvent. The ethylene copolymers contain from 5 to 99% by weight of ethylene and have a melt index (as determined by ASTM D 1238/65 T) of from 0.1 to 100 and preferably from 0.2 to 20 g/10 min (190°C/2.16 kg load).

Copolymerization may also be carried out in emulsion by adding the copolymerizable monomers to an aqueous soap emulsion containing an initiator, a buffer system and, if necessary, a protective colloid and effecting polymerization at elevated pressures, for example pressures of from 500 to 2,000 atmospheres. Copolymerization of the ethylenically unsaturated thioglycol derivatives with acrylates may be carried out in aromatic or aliphatic hydrocarbons acting as solvents.

The polymers of the invention may be used, for example, in the manufacture of shaped articles or as adhesives. It is also possible to use them in admixture with other plastics materials, for example with polyethylene, polypropylene and copolymers of ethylene and vinyl acetate. When polymers of the invention are added to polyethylene or polypropylene even in amounts as low as about 2% by weight, there is a substantial improvement in the dyeability of the latter polymers. The polymers of the invention have a relatively high refractive index and possess antistatic properties. Furthermore, since they have surface-active properties, they are also used, inter alia, for finishing paper and textiles. A particularly noteworthy application is the use of the polymers of the invention in the manufacture of crosslinkable coatings.

The invention is further described with reference to the following Examples, in which parts and percentages are by weight. The K values are determined by the above method proposed by H. Fikentscher.

EXAMPLE 1

To 100 parts of a compound of the formula:

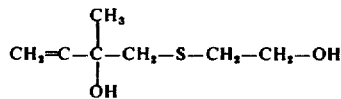

there is added 0.1 part of azodiisobutyronitrile in a nitrogen atmosphere with the exclusion of oxygen. The components are mixed and heated at 60°C for 4 hours.

The homopolymer is precipitated by the addition of methanol and is then washed with methanol and dried. There are obtained 40.5 parts of a polymer having a K value of 63.5 (1% in dimethyl formamide), and having a glass temperature $T_G$ of $-56°C$ and a refractive index $n_D^{20}$ of 1.5803.

EXAMPLES 2 to 10

Ethyl acrylate and

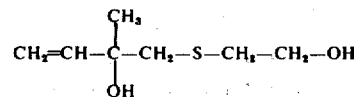

are mixed in various proportions as listed in Table I below, and 0.1% of azodiisubutyronitrile is added to each mixture which is heated for 2 hours at 70°C. The copolymers are precipitated with methanol, washed with methanol and dried in a vacuum drying cabinet for 10 hours at 60°C/12 mm. The results obtained are listed in the following Table I.

TABLE I

| No. | Ethyl acrylate (parts) | Vinyl thioglycol (parts) | Conversion (%) | K Value | Sulfur (%) | % of thioglycol in copolymer (% w/w) |
|---|---|---|---|---|---|---|
| 2 | 9.9 | 0.1 | 36 | 66.0 | 0.9 | 4.6 |
| 3 | 9.5 | 0.5 | 44.9 | 64.0 | 2.6 | 13.2 |
| 4 | 9.0 | 1.0 | 46.2 | 63.5 | 4.3 | 21.8 |
| 5 | 8.5 | 1.5 | 46.6 | 60.0 | 6.2 | 31.5 |
| 6 | 8.0 | 2.0 | 56.3 | 61.5 | 6.9 | 35.0 |
| 7 | 7.0 | 3.0 | 79.8 | 59.0 | 8.9 | 44.5 |
| 8 | 6.0 | 4.0 | 83.5 | 58.5 | 10.3 | 52.2 |
| 9 | 5.0 | 5.0 | 97.8 | 56.0 | 11.4 | 58.0 |
| 10 | 4.0 | 6.0 | 100 | 57.5 | 12.8 | 65.0 |
| 11 | 2.5 | 7.5 | 100 | 55.5 | 14.6 | 74.0 |
| 12 | 1.0 | 9.0 | 100 | 52.5 | 18.0 | 90.9 |

EXAMPLE 13

30 parts of

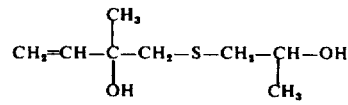

are mixed, at room temperature, with 2 parts of sodium pyrophosphate, 1.5 parts of potassium persulfate, 2 parts of the sodium salt of a sulfonated fatty alcohol of from 10 to 15 carbon atoms and 1,000 parts of water, in an autoclave. The autoclave is sealed and ethylene is pumped in to give an ethylene pressure within the autoclave of 285 atmospheres. The mixture is stirred thoroughly and heated for 8 hours at a temperature of 90°C. The ethylene pressure is maintained constant throughout the reaction by replacing the polymerized amount of ethylene with fresh ethylene. After a reaction time of 8 hours, the solids content of the dispersion is 21%. The K value of the copolymer is 46 (determined on a 1% solution in decahydronaphthalene). The copolymer contains 10.3% of the ethylenically unsaturated thioglycol derivative.

EXAMPLE 14

Example 13 is repeated except that the ethylene is replaced by butadiene and the ethylenically unsaturated thioglycol derivative used is

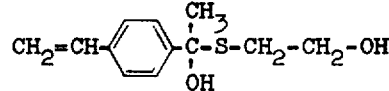

After a reaction time of 8 hours at a reaction temperature of 90°C and a butadiene pressure of 6 atmospheres, there is obtained a dispersion having a solids content of 26.2%. The K value of the copolymer is 76. The copolymer contains 18.6% of the thioglycol derivative in polymeric form.

EXAMPLE 15

Example 9 is repeated except that the acrylate is replaced by acrylonitrile. There is obtained a conversion of 89% and the product has a K value of 66 and contains 54.1% of polymerized units of thioglycol, this being equivalent to a sulfur content of 16.8%.

We claim:
1. Polymers containing units of the general formula:

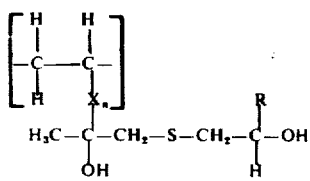

in which
X denotes $-CH_2-$, $-CH_2-CH_2-$,

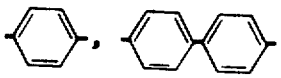

or divalent $C_{3-10}$ cycloalkyl,
$n$ is 0 or 1 and
R denotes H, $C_{1-10}$ alkyl or aryl.

* * * * *

UNITED STATES PATENT AND TRADEMARK OFFICE
CERTIFICATE OF CORRECTION

PATENT NO. : 3,933,765
DATED : January 20, 1976
INVENTOR(S) : NAARMANN et al

It is certified that error appears in the above-identified patent and that said Letters Patent are hereby corrected as shown below:

In the Abstract, Lines 4-6, delete " or divalent $C_{3-10}$ cycloalkyl, n denotes 0 or 1 and R denotes H, $C_{1-10}$ alkyl or aryl." and substitute -- or divalent $C_{3-10}$ cycloalkyl, n denotes 0 or 1 and R denotes H, $C_{1-10}$ alkyl or aryl. --

In Column 1, Line 24, delete "... virtually unpolymeriable.." and substitute --... virtually unpolymerizable...--

$\mathcal{S}$igned and $\mathcal{S}$ealed this

Twenty-first $\mathcal{D}$ay of September 1976

[SEAL]

*Attest:*

RUTH C. MASON
*Attesting Officer*

C. MARSHALL DANN
*Commissioner of Patents and Trademarks*